US007054716B2

(12) United States Patent
McKee et al.

(10) Patent No.: US 7,054,716 B2
(45) Date of Patent: May 30, 2006

(54) SENTRY ROBOT SYSTEM

(75) Inventors: Robert N. McKee, Aurora, OH (US); Jim Holcomb, Shaker Heights, OH (US)

(73) Assignee: Royal Appliance Mfg. Co., Glenwillow, OH (US)

( * ) Notice: Subject to any disclaimer, the term of this patent is extended or adjusted under 35 U.S.C. 154(b) by 136 days.

(21) Appl. No.: 10/655,253

(22) Filed: Sep. 4, 2003

(65) Prior Publication Data

US 2004/0073337 A1    Apr. 15, 2004

Related U.S. Application Data

(60) Provisional application No. 60/408,693, filed on Sep. 6, 2002.

(51) Int. Cl.
*G06F 19/00* (2006.01)
(52) U.S. Cl. .............. 700/245; 700/257; 700/258; 700/259; 318/587; 318/568.1; 701/1; 701/215
(58) Field of Classification Search ........... 700/245, 700/257–259, 264; 701/1, 3, 23–26, 300–301, 701/120, 123, 200, 207–208, 215; 318/587, 318/568.1, 568.11, 568.12, 568.13, 568.16, 318/568.22; 342/587; 15/319, 327.1
See application file for complete search history.

(56) References Cited

U.S. PATENT DOCUMENTS

| 5,220,263 | A | 6/1993 | Onishi et al. |
| 5,341,540 | A | 8/1994 | Soupert et al. |
| 5,659,779 | A | 8/1997 | Laird et al. |
| 5,709,007 | A | 1/1998 | Chiang |
| 6,374,155 | B1 * | 4/2002 | Wallach et al. ............ 700/245 |
| 6,389,329 | B1 | 5/2002 | Colens |
| 6,496,755 | B1 * | 12/2002 | Wallach et al. ............ 700/245 |

(Continued)

FOREIGN PATENT DOCUMENTS

DE    43 23 332 A1    12/1995

(Continued)

OTHER PUBLICATIONS

I. Ulrich, F. Mondada, J.D. Nicoud, "Autonomous vacuum cleaner", *Robotics and Autonomous Systems*, vol. 19, No. 3-4, Mar. 1997, pp. 233-245, Elesevier Science Publishers, Amsterdam, NL.

*Primary Examiner*—Thomas G. Black
*Assistant Examiner*—McDieiunel Marc
(74) *Attorney, Agent, or Firm*—Fay, Sharpe, Fagan, Minnich & McKee, LLP

(57) ABSTRACT

A sentry robot system and method for operating the system is provided. In one embodiment, the robot system includes at least one functional robot with one or more environmental sensors and at least one navigator/controller platform. In another embodiment, the robot system includes one or more functional robots, one or more environmental sensors associated with at least one of the functional robots, and one or more navigator/controller platforms. The navigator/controller platform in this embodiment includes a receiver, a controller, a memory, and a transmitter. In one embodiment, the method includes creating an image map of the environment from environment data, periodically moving the functional robot to predetermined locations, collecting new environment data using the optical image sensor at each predetermined location, and comparing the new environment data to corresponding locations in the image map, and periodically determining if intervention is required due to changed conditions within the environment.

27 Claims, 13 Drawing Sheets

U.S. PATENT DOCUMENTS

| | | |
|---|---|---|
| 6,507,773 B1 * | 1/2003 | Parker et al. ............... 700/258 |
| 6,532,404 B1 | 3/2003 | Colens |
| 6,535,793 B1 | 3/2003 | Allard |
| 6,732,826 B1 | 5/2004 | Sony et al. |
| 6,836,701 B1 * | 12/2004 | McKee ...................... 700/245 |
| 2002/0040271 A1 | 4/2002 | Park et al. |
| 2002/0095239 A1 * | 7/2002 | Wallach et al. ............. 700/245 |
| 2002/0153184 A1 | 10/2002 | Song et al. |
| 2002/0174506 A1 * | 11/2002 | Wallach et al. ............... 15/319 |
| 2002/0193908 A1 * | 12/2002 | Parker et al. ............... 700/258 |
| 2003/0212472 A1 * | 11/2003 | McKee ...................... 700/245 |

FOREIGN PATENT DOCUMENTS

| | | |
|---|---|---|
| WO | WO 98/00239 | 1/1998 |
| WO | WO 01/38945 | 5/2001 |
| WO | WO 01/82766 | 11/2001 |
| WO | WO 02/074150 | 9/2002 |

* cited by examiner

SENTRY ROBOT SYSTEM

This application claims the benefit of U.S. Provisional Application Ser. No. 60/408,693, filed on Sep. 6, 2002, the disclosure of which is incorporated herein by reference.

BACKGROUND OF INVENTION

The invention relates to robot systems. It finds particular application in conjunction with a system and method for allocating mapping, localization, planning, control and task performance functions in a sentry robot system and will be described with particular reference thereto. However, it is to be appreciated that the invention is also amenable to other applications.

Mobile robots have been designed, developed and deployed to handle a variety of tasks such as cleaning and security. Most mobile robots are non-autonomous; that is, they are unable to autonomously navigate. The economic benefits provided by non-autonomous robots are limited by the inflexible behavior of the robots and their extensive installation costs. Skilled technicians often must be hired and paid to preprogram the robots for specific routes and tasks. It may be necessary to install objects in the environment to guide the robots, such as tracks, buried signal emitting wires, markers or sensors. Further modifications to the environment may also be necessary to minimize installation and operational problems.

Some mobile non-autonomous robots can detect obstacles blocking their paths, and can stop or deviate slightly from their paths to avoid such obstacles. If the environment is modified significantly, however, such as by moving a large item of furniture, conventional non-autonomous robots do not properly react. Part or all of the installation process often must be repeated. Given this limitation, non-autonomous robots are usually deployed only on stable and high value routes. Though some non-autonomous robots rely on random motion to perform their tasks, such as pool cleaning robots, only a limited number of applications are amenable to this approach.

Fully autonomous mobile robots have begun to emerge from research laboratories during the past few years. Autonomous robots are able to navigate through their environment by sensing and reacting to their surroundings and environmental conditions. Autonomous robot navigation involves four primary tasks: mapping, localization, planning and control. These closely related concepts are analogous to asking the questions "Where am I?" (mapping and localization), followed by "Where do I want to be?" or "What do I want to do?" (planning), and finally, "How do I get there?" or "How do I do that?" (control).

Once mapping is complete, the robot's current position, orientation and rate of change within the map must be determined. This process is referred to as localization. Autonomous robots that rely on 2D mapping and localization are often not able to navigate with adequate reliability due to the relative simplicity of the map. Often, the robots become lost, stuck or fall. Use of dynamic 3D mapping and localization, by contrast, permits navigation that is more reliable but involves complex calculations requiring a large amount of computational overhead. 3D maps typically have millions of cells, making straightforward operations such as landmark extraction, localization and planning computationally intensive. The resulting computational delays limit the speed of robot movement and task performance.

Once mapping and localization are accomplished, task planning and performance must be undertaken. Some localization will still be required during task performance. With one robot attempting to localize while performing tasks leads to unacceptable delays. If multiple robots are used, the tradeoffs described above are often still present, and must now be dealt with multiple times over.

Published PCT patent application No. WO 01/38945 A1, now U.S. Pat. No. 6,374,155 to Wallach et al. and assigned to Personal Robotics, Inc., discloses an autonomous mobile robot system that allocates mapping, localization, planning and control functions to at least one navigator robot and allocates task performance functions to one or more functional robots. The at least one navigator robot maps the environment, localizes itself and the functional robots within the map, plans the tasks to be preformed by the at least one functional robot and controls and tracks the at least one functional robot during task performance. The at least one navigator robot performs substantially all calculations for mapping, localization, planning and control for both itself and the functional robots. In one implementation, the at least one navigator robots remains stationary while controlling and moving the at least one functional robot in order to simplify localization calculations. In another embodiment, the at least one navigator robot is equipped with sensors and sensor processing hardware required for these tasks, while the at least one functional robot is not equipped with sensors or hardware employed for these purposes.

In view of the above, a sentry robot system having fast, accurate and cost effective mapping and localization, as well as effective planning and allocation of tasks with improved sensing of the environment is needed.

BRIEF SUMMARY OF INVENTION

The invention overcomes the drawbacks of conventional systems currently in use by providing near real-time maneuvering and task completion. An ideal application of the invention is in home or business security, which typically involves multiple and repetitive tasks such as moving from point-to-point and detecting conditions requiring further attention. The invention, however, could be implemented in any environment where robots are maneuvered to perform assigned tasks. In one embodiment of the invention, mapping, localization, planning and control functions are assigned to at least one stationary navigator/controller platform and at least one functional robot with sensors, and task performance functions are assigned to at least one functional robot. For each task, a navigator/controller platform and a given functional robot work in tandem. Accordingly, in one embodiment, a method of performing a repetitive task within an area is provided. In another embodiment of the invention, a method for autonomous multi-platform robot operation is provided.

In another embodiment, the robot system includes at least one first-type functional robot with one or more environmental sensors, the at least one first-type functional robot configured to perform one or more repetitive tasks within an area, the one or more repetitive tasks including collection and transmission of environment data associated with at least a portion of the area, and at least one navigator/controller platform configured to receive environment data transmitted by the at least one first-type functional robot, direct overall movement of the at least one first-type functional robot within the area, and control the at least one first-type functional robot during performance of the one or more repetitive tasks.

In still another embodiment, the robot system includes one or more functional robots that are responsible for performing functional tasks, one or more environmental sensors associated with at least one of the one or more functional robots for collecting environment data associated with the area, wherein the functional tasks performed by the at least one of the one or more functional robots include collection and transmission of the environment data, and one or more navigator/controller platforms that localize themselves and the one or more functional robots within the area using the environment data, plan the functional tasks to be performed by the one or more functional robots, and control the one or more functional robots during performance of the functional tasks. The navigator/controller platform in this embodiment includes a receiver for receiving the environment data transmitted by the at least one of the one or more functional robots, a controller for generating maps of the area from the environment data and for controlling operations of the one or more functional robots, a memory for storing the maps of the area, and a transmitter for transmitting control signals to the one or more functional robots.

In yet another embodiment, the robot system includes one or more first-type functional robots with one or more environmental sensors, the one or more first-type functional robots are responsible for collecting environment data using the one or more environmental sensors, for transmitting the environment data, and for performing functional tasks, and one or more navigator/controller platforms that control the one or more first-type functional robots during collection of the environment data, receive the environment data, use the environment data to localize themselves and the one or more first-type functional robots within the environment, plan the functional tasks to be performed by the one or more first-type functional robots, and control the one or more first-type functional robots during performance of the functional tasks.

A method for operation of a sentry robot system within an environment is provided in another aspect of the invention. The sentry robot system includes at least one functional robot with one or more environmental sensors and at least one navigator/controller platform, the one or more environmental sensors including at least one optical image sensor. The method includes the steps: a) collecting environment data in an area of the environment surrounding the at least one functional robot using the at least one optical image sensor, b) transmitting environment data from the at least one functional robot to the at least one navigator/controller platform, c) transmitting control signals from the at least one navigator/controller to the at least one functional robot to move the at least one functional robot to another area of the environment, d) repeating steps a) through c) until an initial set of environment data for the environment is collected and transmitted, e) creating an image map of the environment from the environment data, f) periodically moving the at least one functional robot to one or more predetermined locations within the environment, collecting new environment data using the at least one optical image sensor at each predetermined location, and comparing the new environment data to corresponding locations in the image map, and g) periodically determining if intervention is required due to changed conditions within the environment.

Benefits and advantages of the invention will become apparent to those of ordinary skill in the art upon reading and understanding the description of the invention provided herein.

BRIEF DESCRIPTION OF DRAWINGS

The invention is described in more detail in conjunction with a set of accompanying drawings.

DETAILED DESCRIPTION OF INVENTION

Figure 1:
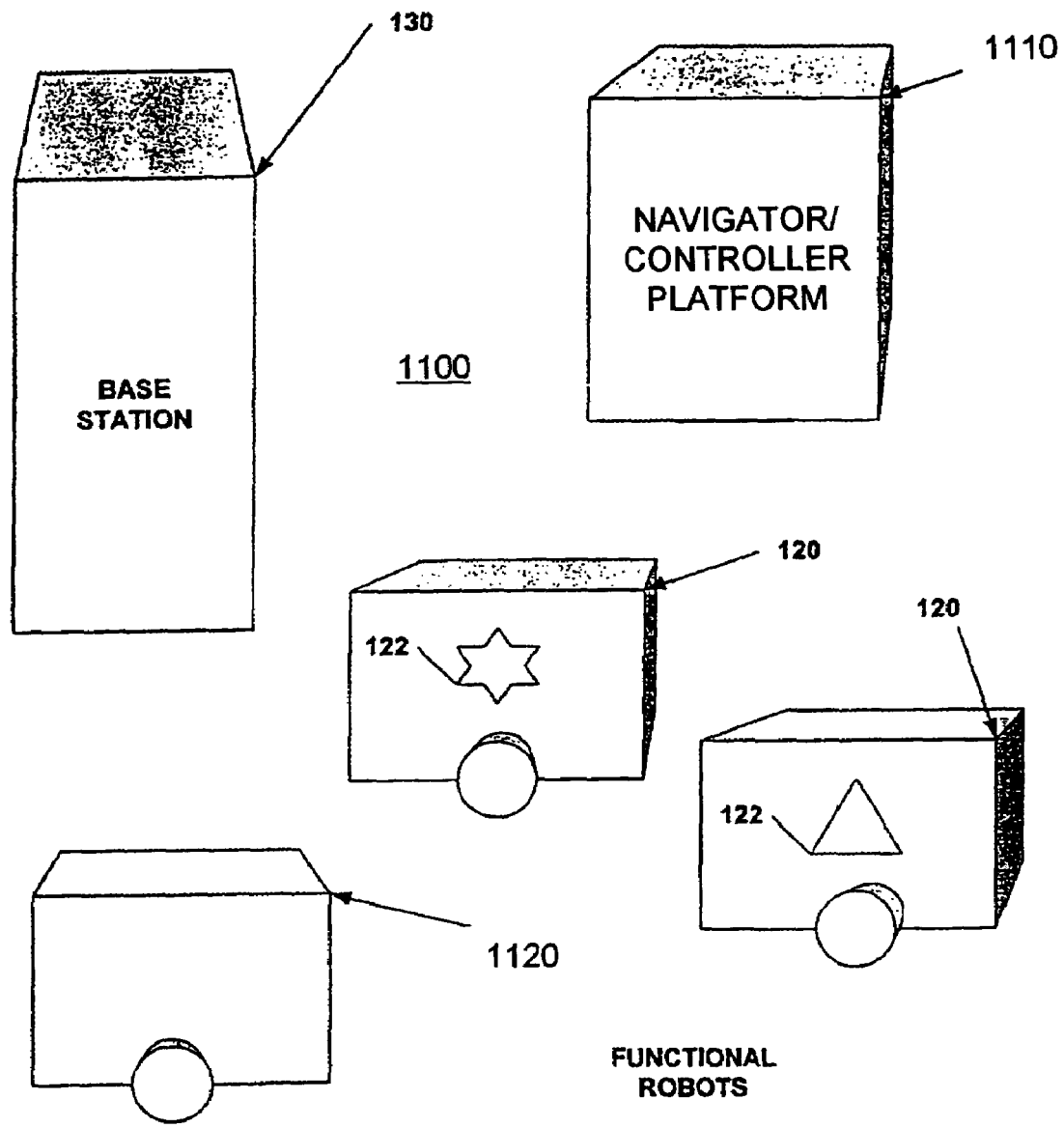
FIG. 1 is a block diagram of a robot system in one embodiment of the invention.

While the invention is described in conjunction with the accompanying drawings, the drawings are for purposes of illustrating exemplary embodiments of the invention and are not to be construed as limiting the invention to such embodiments. It is understood that the invention may take form in various components and arrangements of components and in various steps and arrangements of steps beyond those provided in the drawings and associated description. Within the drawings, like reference numerals denote like elements.

FIG. 1 is a block diagram of a robot system 1100 in one embodiment of the invention. System 1100 includes one or more navigator/controller platforms 1110, one or more functional robots 120, 1120, and (optionally) one or more a base stations 130. The functional robots 120, 1120 may include functional robots with environmental sensors 1120 and functional robots without environmental sensors 120. The functional robots with environmental sensors 1120 may be considered sentry robots. It is noted that base stations 130, while providing advantages that will be described below, are not required in all embodiments.

Base station 130, if included, may be equipped with charging stations to recharge the mobile robots 120, 1120. Moreover, base station 130 may be configured to assist in task performance. If, for example, system 1100 is implemented in a residential environment, base station 130 may be equipped with homing signal sensors and the like, to aid in the performance of the required tasks.

In one embodiment, a navigator/controller platform 1110 and functional robots with environmental sensors 1120 are responsible for all or substantially all mapping, localization, planning and control functions. Navigator/controller platform 1110 creates and maintains environment maps, a list of tasks to be accomplished, a task schedule and a charging schedule. Functional robots 1120 are configured with all environmental sensors and hardware required to collect and transmit environment data to navigator/controller platform 1110. Navigator/controller platform 1110 is configured with all hardware required for receiving the environment data and navigating and maneuvering the functional robots 120, 1120. In this regard, navigator/controller platform 1110 has a transmitter for communicating commands to functional robots 120, 1120.

Functional robots 120, 1120 carry out specific tasks and may be shaped and sized to facilitate performance of those tasks. Robots 120, 1120 are equipped with receivers for receiving commands from navigator/controller platform 1110. As shown in FIG. 1, unique shapes or markings 122 may be applied to functional robots without environmental sensors 120 to assist navigator/controller platform 1110 in recognizing, locating and tracking them. Also, one or more functional robot with environmental sensors 1120 can be used for this purpose. In addition to assisting the navigator/controller platform 110 in recognizing, locating and tracking other functional robots 120, 1120, a functional robot with environmental sensors 1120 may carry out specific tasks as a roving security sentry.

Figure 2:
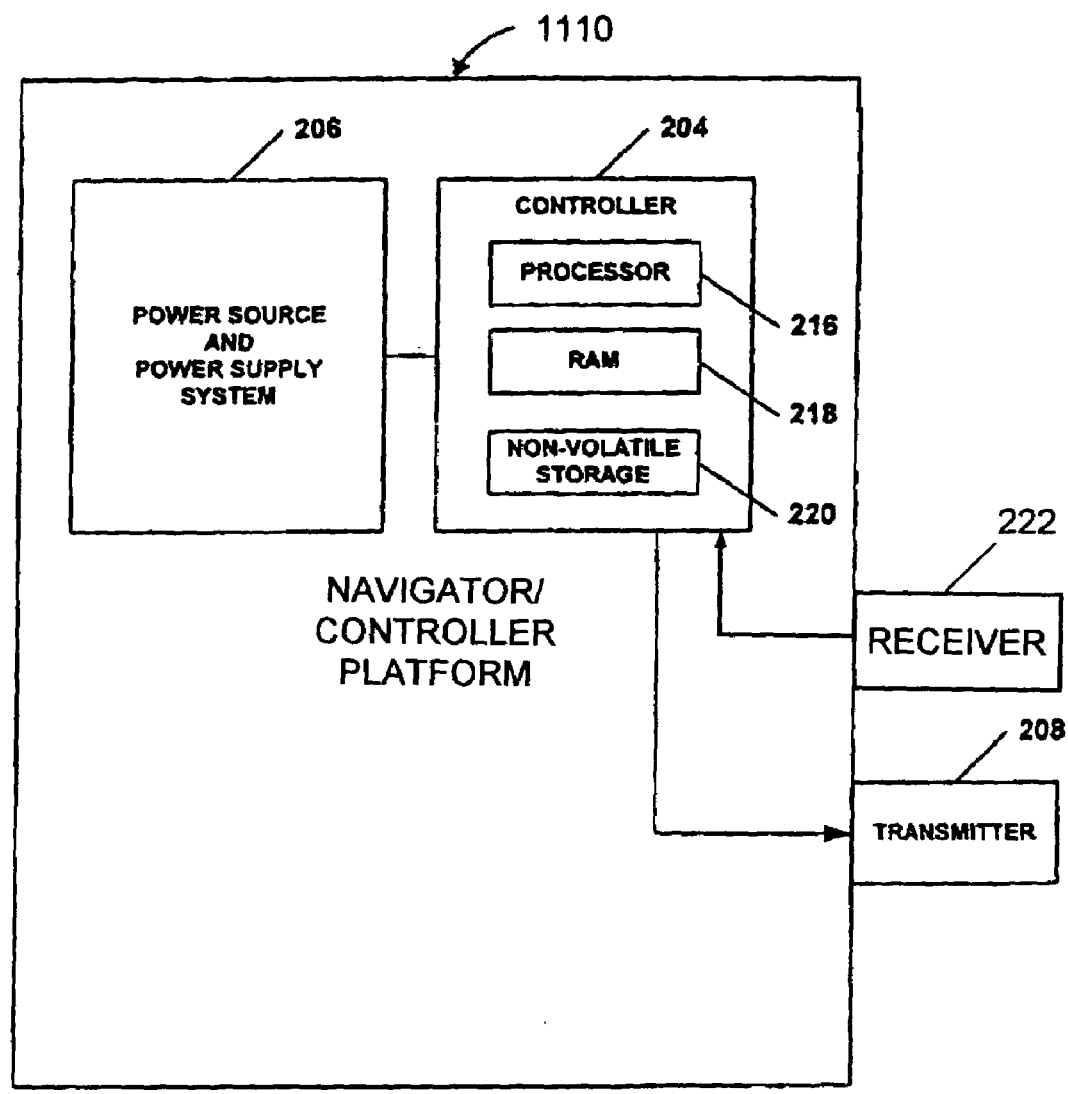
FIG. 2 is a block diagram of one embodiment of a navigator/controller platform of the robot system.

FIG. 2 is a block diagram of one embodiment of a navigator/controller platform 1110 of system 1100. The particular implementation of navigator/controller platform 1110 shown in FIG. 2 is provided for illustrative purposes only and should not be interpreted as requiring a specific physical architecture for navigator/controller platform 1110.

In this embodiment, navigator/controller platform 1110 includes controller 204, power source and power supply system 206, transmitter 208, and receiver 222. Controller 204 comprises a processor or central processing unit (CPU) 216, a temporary storage or RAM 218, and a nonvolatile storage 220. Information such as maps and task schedules are stored in nonvolatile storage 220 which, in one implementation, is an EPROM or EEPROM. Controller 204 receives and processes information from environmental sensors on board functional robots 1120 via receiver 222. The information received is data regarding the environment surrounding the robot 1120. This may include information such as the location of navigator/controller platform 1110, the location of functional robots 120, 1120, nearby landmarks, and the contents of areas surrounding the robot 1120. Controller 204 uses this information to initially map the environment and subsequently to determine what tasks or movements are to occur next. Additionally, when the system 1100 is using the functional robot 1120 as a roaming sentry, the images received are compared with stored images to determine if any change in the surrounding area warrants intervention. The stored images may be images associated with the initial mapping of the environment or images from subsequent passes through the environment by the sentry robots. As such, the initial environment map may be periodically updated with later images if no intervention is required due to the later image or if a remote user reviewed the later image and determined that no actual emergency condition existed.

Figure 3A:
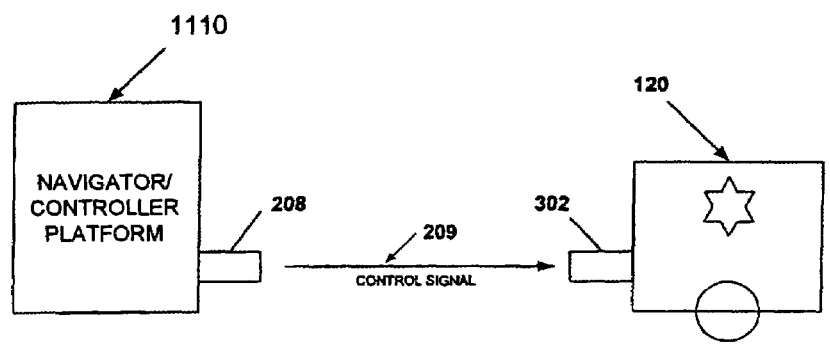
FIGS. 3a and 3b are a set of block diagrams depicting communications between one embodiment of a navigator/controller platform and two embodiments of functional robots.

FIG. 3a depicts one aspect of system 1100 in operation. Navigator/controller platform 1110 controls the movement and operation of one or more functional robots 120 via transmitter 208 and a control signal 209 that is received by a receiver 302 of the functional robot 120.

Figure 3B:
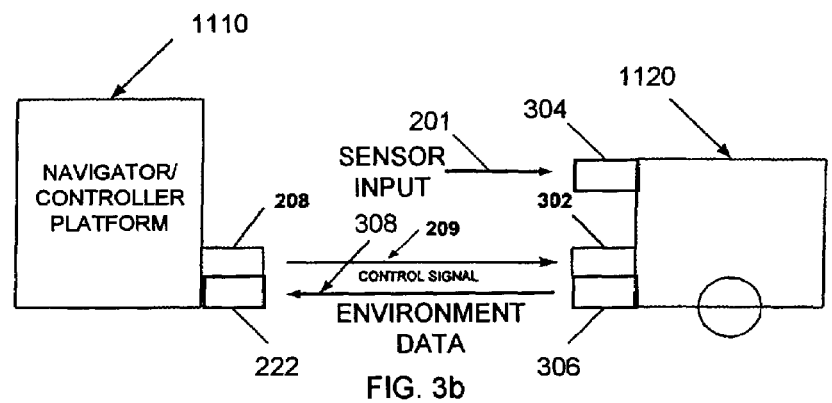

FIG. 3b depicts another aspect of system 1100 operation—one or more functional robots 1120 receive environmental sensor input data 201 via environmental sensors 304 and transmit environment data 308 to navigator/controller platform 1110 via transmitters 306. Navigator/controller platform 1110 receives the environment data 308 via its receiver 222 and determines what task, movement, or other functions functional robots 120, 1120 are to undertake next. Once determined, similar to FIG. 3a, navigator/controller platform 1110 controls the movement and operation of functional robots 1120 via transmitter 208.

Transmitter 208 and receiver 302 may use any suitable conventional communication means and medium. Likewise, transmitter 306 and receiver 222 may use any suitable conventional communication means and medium. In one implementation, acoustic waves are used for communication between navigator/controller platform 1110 and functional robots 120, 1120. In one implementation example, an acoustic wave at one frequency would denote a command to move in one direction (e.g., from navigator/controller platform 1110 to functional robot 120, 1120), while an acoustic wave at another frequency would denote a command to move in another direction (e.g., from functional robot 1120 to navigator/controller platform 1110). Other suitable communication means include, but are not limited to, wired or wireless communication, infrared signals and magnetic induction.

Figure 4A:
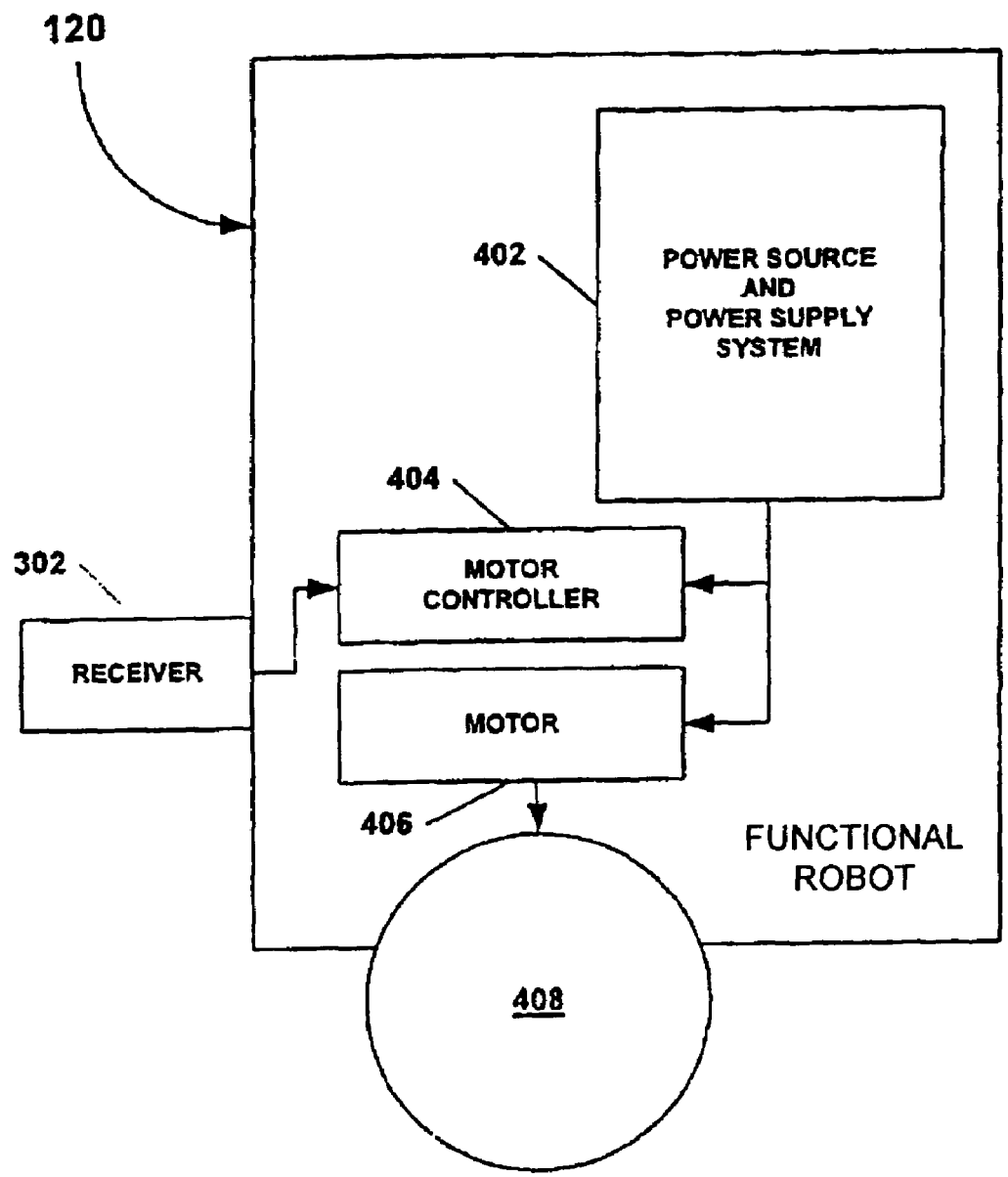
FIG. 4a is a block diagram of one embodiment of a functional robot of the robot system.

The particular implementation of functional robot 120 shown in FIG. 4a is provided for illustrative purposes only and should not be interpreted as requiring a specific physical architecture for robot 120.

As described above, functional robot 120 includes a receiver 302. The control loop for moving and maneuvering robot 120 comprises a power source and power supply system 402, motor controller 404, motor 406 and wheels 408. Control signals received from navigator/controller platform 1110 via receiver 302 direct motor controller 404. Controller 404 controls motor 406, which in turn drives wheels 408. The control loop may also comprise servos, actuators, transmitters and the like.

Figure 4B:
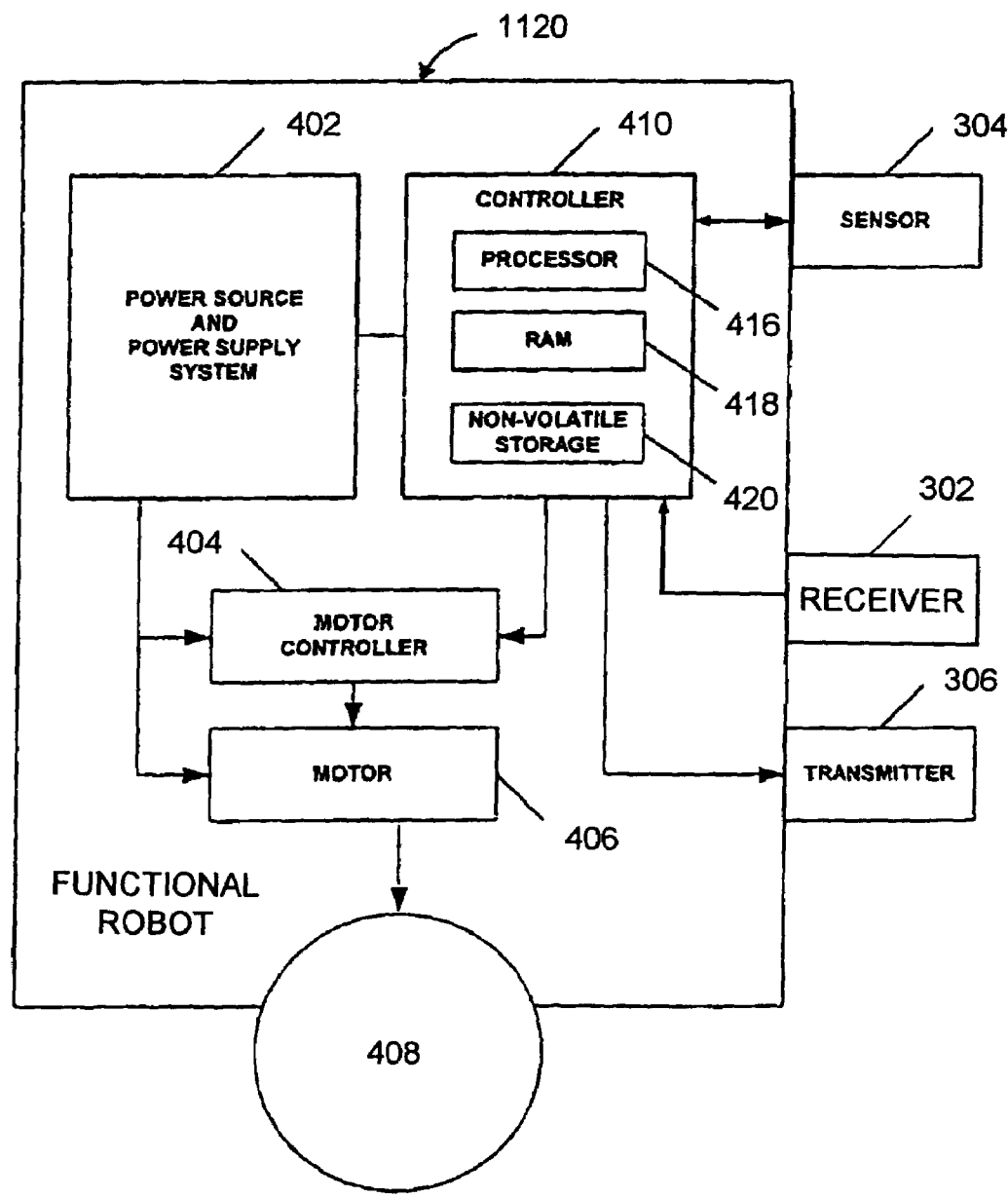
FIG. 4b is a block diagram of another embodiment of a functional robot of the robot system.

The particular implementation of functional robot 1120 shown in FIG. 4b is provided for illustrative purposes only and should not be interpreted as requiring a specific physical architecture for robot 1120.

An environmental sensor 304 is mounted on functional robot 1120. Environmental sensor 304 may be any type of environmental sensor that is suitable for the robot's environment, and multiple environmental sensors may be utilized. It may be mounted in a fixed position or, alternatively, may be configured such that it is able to change position and orientation relative to robot 1120. Depending on the environmental sensor type and system complexity, the position and orientation of sensor 304 may or may not be under the control of robot 1120. In one example implementation, environmental sensor 304 is a camera that records optical images of the surrounding environment. In another implementation, environmental sensor 304 comprises a set of cameras to provide stereo vision for obtaining more detailed and accurate information about the robot's environment. Other environmental sensor options include, but are not limited to, radar, lidar, sonar and/or combinations thereof. The operation and configuration of such environmental sensors will be familiar to those of ordinary skill in the art.

Robot 1120 further comprises controller 410, power source and power supply system 402, receiver 302, transmitter 306, motor controller 404, motor 406, and wheels 408. Controller 410 is similar to the controller 204 described above for navigator/controller platform 1110. For example, controller 410 comprises a CPU 416, a temporary storage or RAM 418, and a nonvolatile storage 420. Controller 410 receives and processes information from environmental sensor 304 regarding the robot's surrounding environment. This may include information such as the location of navigator/controller platform 1110, the location of functional robots 120, 1120, nearby landmarks, and the contents of areas surrounding the robot 1120. Environment information from the environmental sensor 304 is stored in nonvolatile storage 220 which, in one implementation, is an EPROM or EEPROM. The controller 410 transmits the environmental sensor data to navigator/controller platform 1110 via transmitter 306.

Like functional robot 120, functional robot 1120 includes a receiver 302. The receiver 302 receives commands for operating and maneuvering the robot 1120 from navigator/controller platform 1110 and communicates the commands to the controller 410. The control loop for moving and maneuvering robot 1120 comprises power source and power supply system 402, motor controller 404, motor 406 and wheels 408. The controller 410, based on operating and maneuvering commands, sends appropriate commands to motor controller 404. Motor controller 404 directs motor 406 according to these commands. Motor 406, in turn, drives wheel 408. As with robot 120, the control loop in robot 1120 may also comprise servos, actuators, transmitters and the like.

As noted above, the invention provides a system and method for allocating mapping, localization, planning, control and task performance in an autonomous multi-platform robot environment. In particular, in one embodiment, mapping, localization, preplanning, and planning and control functions are assigned to a navigator/controller platform and a functional robot with environmental sensors, and task performance functions are assigned to at least one functional robot.

In one embodiment, navigator/controller platform 1110 performs mapping functions in conjunction with a functional robot 1120. Mapping is the process by which a representation of the environment is created and updated from environmental sensor data and preprogrammed input. Several maps having different levels of resolution, stability and/or coordinate systems may be maintained. Dynamic mapping maintains the current dynamic map (CDM), which is a probabilistic two-dimensional (2D) or three-dimensional (3D) map of the robot's environment. A static map of the environment's outer perimeter (i.e. room walls or yard boundaries) may also be created. The maps created by navigator/controller platform 1110 are stored in RAM 218 or non-volatile memory 220 (FIG. 2).

The iterative mapping process essentially comprises the steps of collecting environmental sensor data of the objects and obstacles in the immediately surrounding area of a functional robot with environmental sensors 1120, performing localization, and updating the dynamic map to incorporate information derived from the new environmental sensor data. The functional robot with environmental sensors 1120 can be iteratively moved to collect information for a given environment. The process may be computationally intensive and time consuming. As will be explained, however, consolidation of the environment data for mapping functions in navigator/controller platform 1110 reduces the time required for mapping to a fraction of the time that conventional systems require for mapping.

As noted above, in addition to a dynamic map of the environment, a static map of the environment's outer perimeter may be created. The static map may include, for example, the walls of a building or the boundaries of a yard. It may be predetermined and input to navigator/controller platform 1110 or, alternatively, navigator/controller platform 1110 may make a static map of the environment before task performance is initiated. In the latter case, in one embodiment, navigator/controller platform 1110 works in conjunction with a functional robot with environmental sensors 1120 to follow a physically distinct perimeter, maintaining a dynamic map as the robot 1120 moves and incorporating perimeter information from the dynamic map into the static map. The process continues until the static map is complete, consistent and stable.

The process of creating the static map is relatively long and iterative. Preferably, it is done just once upon introduction of the system to a new environment. The exact methodology used to create the map will depend on the environmental sensors used and algorithms chosen to perform the calculations. Once created, in one implementation, the static map is permanently stored in navigator/controller platform 1110. The navigator/controller platform 1110 can locate its position in the static map by recognizing landmarks and other physical attributes of the environment in conjunction with a functional robot with environmental sensors 1120 and by aligning the CDM within the static map. No origin or reference point is required. The use of certain assumptions may shorten the time and computation required to create the static map. In a home or business environment, for example, it can he assumed that walls are square and flat. Use of such assumptions decreases the time required for creating the static map.

In one implementation, the mapping process includes three maps created from environmental sensor data derived from a pair of stereo digital cameras mounted on one or more functional robots 1120. The first map in this implementation is a temporary map (TM) of immediate surroundings of the functional robot 1120. In particular, the TM is a probabilistic representation created from the last stereo pair of images of the immediately surrounding environment. The second map in this implementation is the CDM. The CDM is a probabilistic 3D representation of the working environment and is created by iteratively incorporating information from successive TMs. The CDM in this implementation is updated every time the functional robot 1120 is moved. The third map in this implementation is the static perimeter map (PM). As described above, the PM is created as functional robot 1120 follows the outer perimeter of the environment.

In another implementation, the map(s) are not created by navigator/controller platform 1110, but rather, are input to or preprogrammed in navigator/controller platform 1110. In a further implementation, a static map is not created or input before task initiation. In this implementation, navigator/controller platform 1110 simply starts with a blank dynamic map and updates it as tasks are performed.

Figure 5:
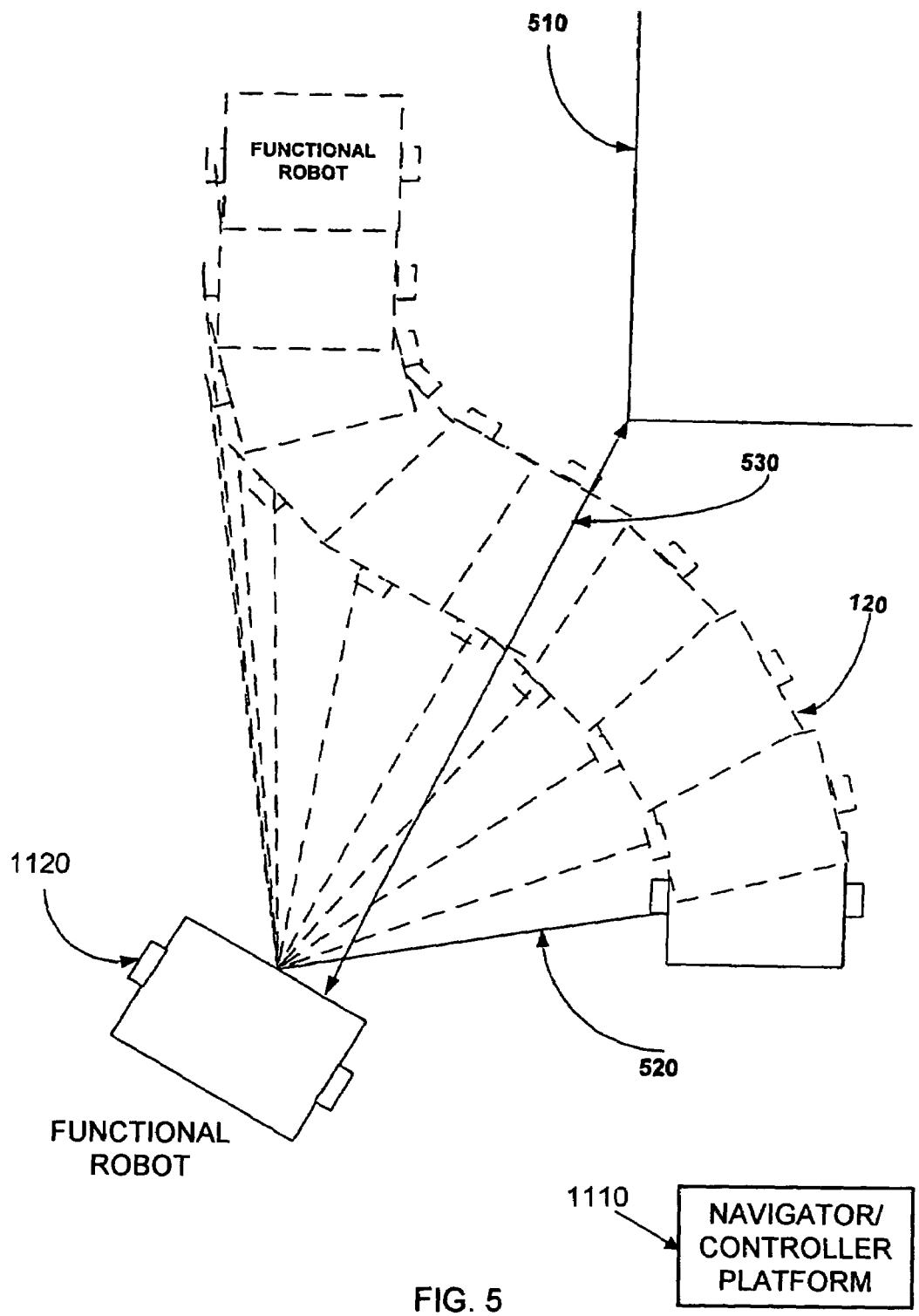
FIG. 5 is a block diagram depicting a navigator/controller platform as it maneuvers a functional robot around an obstacle.

In the embodiment of FIG. 5, navigator/controller platform 1110, in conjunction with functional robot 1120, is responsible for navigating functional robot 120 around the mapped environment, including walls 510. In this embodiment, navigator/controller platform 1110 is responsible for substantially all aspects of navigation, including localization, planning and control for functional robot 120, as shown at 520 and 530. In conventional systems, by contrast, each mobile robot is responsible for its own localization, planning and control. Each robot in such systems is responsible for navigating and maneuvering itself into the proper position to perform a task. Such systems are subject to localization calculation delays for all the robots, which makes task completion slow and inefficient. The embodiment being described avoids such delays and increases efficiency by gathering substantially all navigation functions in one navigator/controller platform 1110 and minimizing the need to move or shift navigator/controller platforms.

Figure 6:
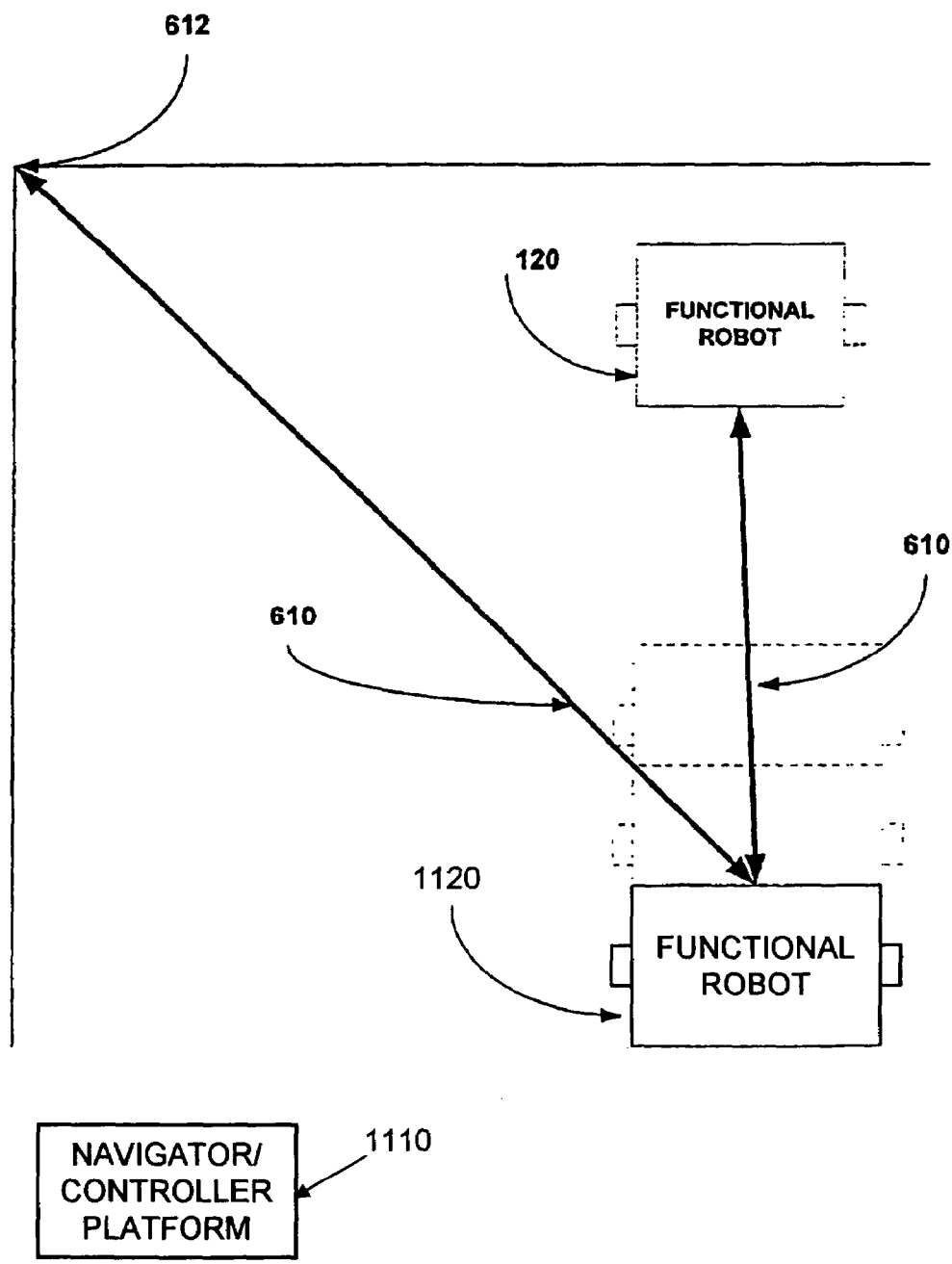
FIG. 6 is a block diagram depicting one embodiment of a functional robot as it maneuvers itself toward another functional robot.

Localization is the process by which the robot's current position, orientation and rate of change within the map is determined. Different procedures may be used for localizing the navigator/controller platform and for localizing the functional robots. Localization of the functional robots is relatively simple, since the navigator/controller platform, in one embodiment, is stationary or substantially stationary when localizing the functional robots and thus knows its location within the CDM. In one implementation as shown in FIG. 6, the navigator/controller platform 1110 simply tracks the functional robots 120 using vision systems (environmental sensors) in a second functional robot 1120, as shown at 610 and 612, and then filters the vision data with a tracking filter, such as a Kalman filter. If the first functional robot 120 has moved or rotated a short distance, the environmental sensors 304 at the second functional robot 1120 can detect this movement and locate the first functional robot 120. In implementations that use a base station, the location of functional robots near the base station can also be quickly ascertained.

The unique shapes and/or geometric markings 122 on functional robots 120 may also assist navigator/controller platform 1110 in locating robots 120. The type of environmental sensor 304 that is used by functional robot 1120 will dictate whether a unique shape or marking is used and how it is recognized. In one implementation, navigator/controller platform 1110 uses a neural net to process environmental sensor data and to recognize specific shapes. In another implementation, the navigator/controller platform uses the vision or environmental sensor system on board the functional robot 1120 to recognize any markings and/or shapes.

In addition to localizing the functional robots 120, 1120, navigator/controller platform 1110, in one embodiment, localizes itself, if it has been moved or repositioned. Localization of the navigator/controller platform is inextricably linked with mapping, particularly with the maintenance of the CDM (i.e., in order to maintain the CDM, the navigator/controller platform must know where it is within the CDM). Where both a CDM and a static PM are used, localization involves determining the locations of both the navigator/controller platform and functional robots within those maps. Note that the CDM may be preprogrammed.

The process of localizing the navigator/controller platform is typically more involved than the process of localizing the functional robots. Potential methods by which the navigator/controller platform may localize itself include active beacon, active environmental sensor and landmark recognition methods. Active beacon localization methods determine the navigator/controller platform's position by measuring its distance from beacons placed at known positions in the environment. Triangulation can then be used to pinpoint the navigator/controller platform's location. Active environmental sensor localization methods track the navigator/controller platform's position with environmental sensors, such as digital cameras, that are placed at known, fixed locations. Landmark recognition methods may be used in which the navigator/controller platform recognizes and knows the position of features and landmarks within the environment. The recognized landmark positions are used to calculate the navigator/controller platform's position.

Real world factors and constraints may limit the feasibility of some localization techniques. Active beacon and environmental sensor methods typically require installation of foreign objects such as cameras or reflective tape in the navigator/controller platform's environment. While installation of such objects may be acceptable in factory and industrial settings, it is generally not acceptable in home, office and outdoor environments. For these reasons, use of landmark recognition localization is provided in one embodiment of the invention.

Nevertheless, factors such as limited sensor resolution typically make localization less than completely accurate. A number of localization algorithms, such as the Markov and Monte Carlo algorithms, may be used to further improve localization accuracy.

Figure 7A:
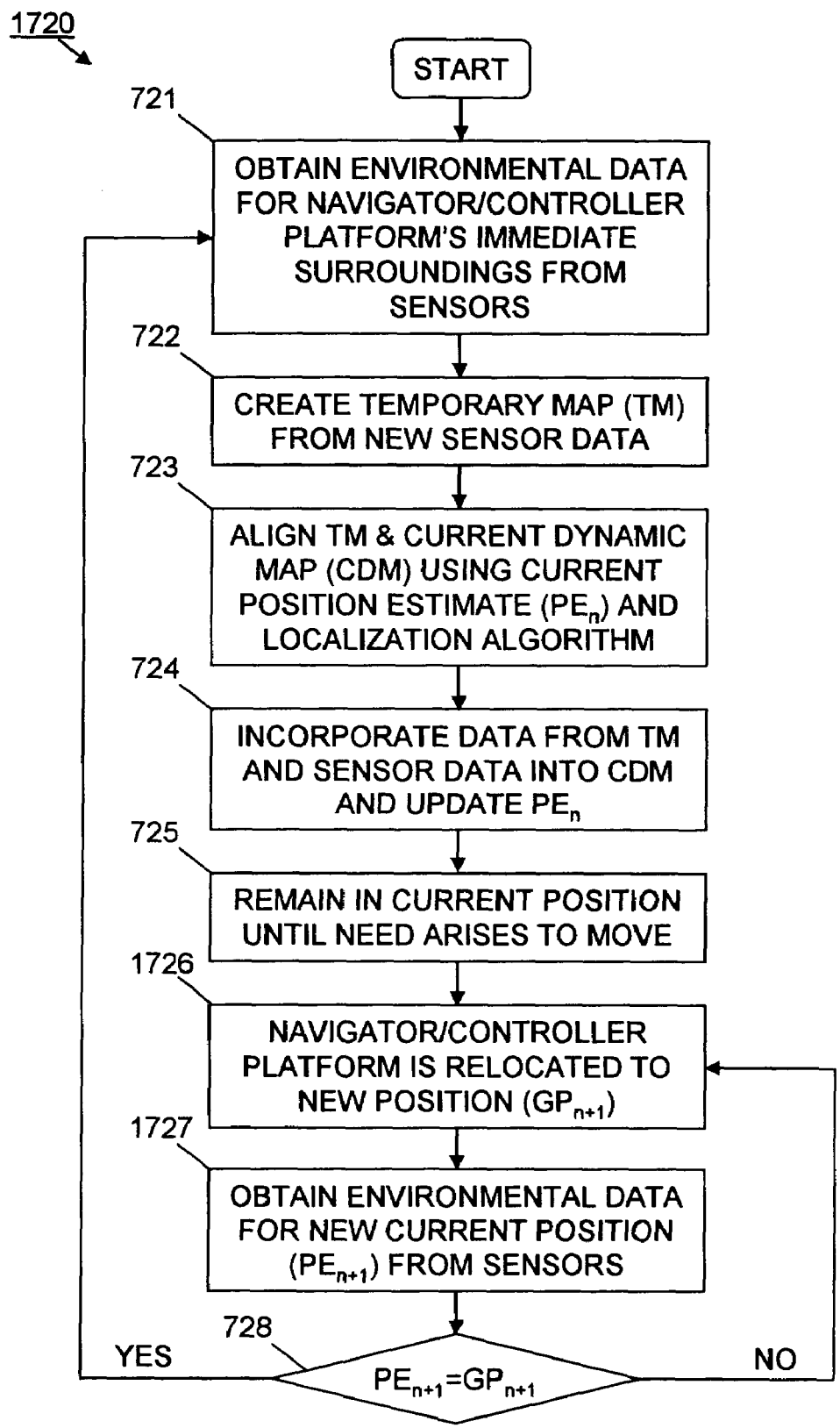
FIG. 7a is a flow diagram illustrating one method by which the navigator/controller platform localizes itself within a dynamic map of the environment.

FIG. 7a is a flowchart illustrating the substeps that may be involved in one embodiment of the mapping and localization process 1720 for navigator/controller platform 1110. At step 721, navigator/controller platform 1110 obtains environmental sensor data for its immediate surroundings from environmental sensors aboard a functional robot with environmental sensors 1120. In one embodiment, a pair of digital stereo cameras is used to obtain the environmental sensor data. From the stereo image pair, a new TM is created in step 722 and aligned relative to the CDM (step 723). In order to align the temporary and current maps, a set of position estimates $PE_{n+1,1} \ldots PE_{n+1,m}$ is generated. A localization algorithm such as the Markov or Monte Carlo localization algorithms may be used to generate this set of estimates. The range of error in the position estimates will dictate how large the factor m is. The best estimate $PE_{n+1,k}$ ($1 \leq k \leq m$) from the range is selected and, using $PE_{n+1,k}$, information is extracted from the TM and environmental sensor data and added to the CDM (step 724). The TM is then discarded.

Navigator/controller platform 1110 remains stationary (step 725) to minimize computation. However, eventually navigator/controller platform 1110 may need to be moved. If a need arises for navigator/controller platform 1110 to be moved, navigator/controller platform 1110 must be relocated to a new position ($GP_{n+1}$) manually 1726. In one embodiment, navigator/controller platform 1110 tracks the position of one or more functional robots or other recognized landmarks (through a tracking filter) using environmental sensors aboard a functional robot with environmental sensors 1120 in order to provide an improved estimate of its current position (step 1727). When navigator/controller platform 1110 determines that its latest position estimate $P_{n+1}$ is within an acceptable threshold relative to the new goal position $GP_{n+1}$ (decision node 728), it stops and returns to step 721 to repeat the localization and mapping process.

It should also be noted that rather than moving navigator/controller platform 1110, the system 1100 may merely transition control to a second pre-positioned navigator/controller platform 1110. Still another alternative is for navigator/controller platform 1110 to control additional functional robots with environmental sensors 1120 as repeaters for control signals and environmental sensor data to extend the range of communications between the navigator/controller platform 1110 and the functional robot 1120 transmitting the environmental sensor data. Additional, alternatives are also contemplated, such as using stationary environmental sensor data/control signal repeater platforms to extend the range or mobilizing the navigator/controller platform (FIG. 13) with wheels and associated control components similar to those in the mobile functional robots.

Figure 7B:
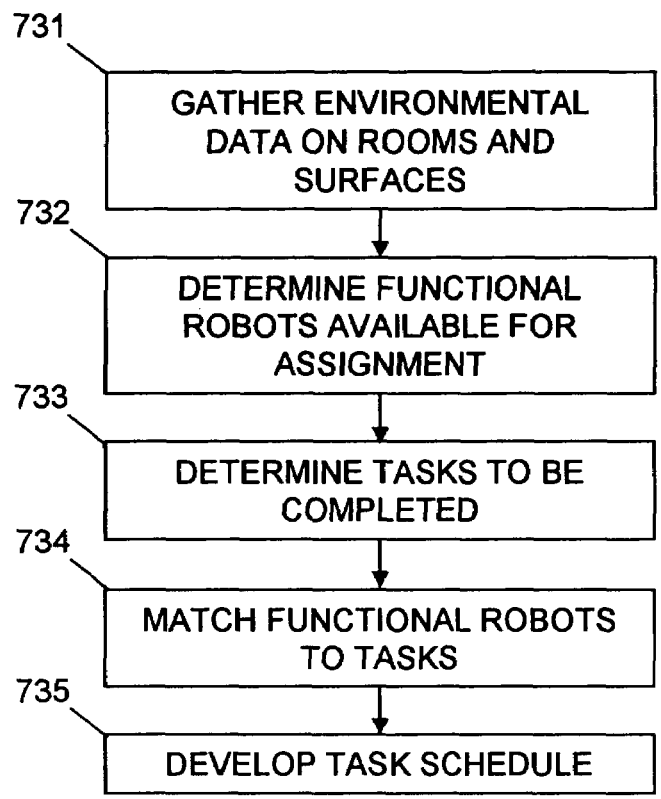
FIG. 7b is a flow diagram illustrating one method by which the navigator/controller platform performs preplanning.

In one embodiment, navigator/controller platform 1110 may gather information about the environment and perform information gathering and preplanning. The various substeps that may be involved in one embodiment of the information gathering and preplanning processes are illustrated in more detail in FIG. 7b. It is noted that the steps illustrated in FIG. 7b may be performed in any order, and that each of the steps is optional. That is, information gathering and preplanning may be accomplished without some of the listed steps, and some of the listed steps may be preprogrammed or input to navigator/controller platform 1110.

In step 731, navigator/controller platform 1110 gathers additional data such as the characteristics of the room or environment in which one or more of the functional robots are present (i.e., size, obstacle locations, etc.) and the types of surfaces present in those rooms. In one embodiment, data is collected for each of the functional robots in the system. This data may be gathered using the same environmental sensors used for mapping and localization or, alternatively, different environmental sensors may be used to gather the data. For example, if a sonar environmental sensor is used for mapping and localization, a different environmental sensor, such as a camera, is generally used for gathering data such as room surface features and characteristics.

In step 732, navigator/controller platform 1110 determines what functional robots 120, 1120 are available for task performance. Alternatively, this information may be input to or preprogrammed in navigator/controller platform 1110, or it may simply be unnecessary information. Next, in step 733, navigator/controller platform 1110 determines what tasks need to be performed. Again, this information may be preprogrammed in navigator/controller platform 1110, input via an interface, or determined via a combination of preprogramming and input.

Using the information gathered in steps 731–733, navigator/controller platform 1110 matches the available functional robots to the tasks to be performed (step 734) and develops a task schedule (step 735). Each task may be divided into subtasks in order to minimize navigator/controller platform movement and increase efficiency.

Figure 7C:
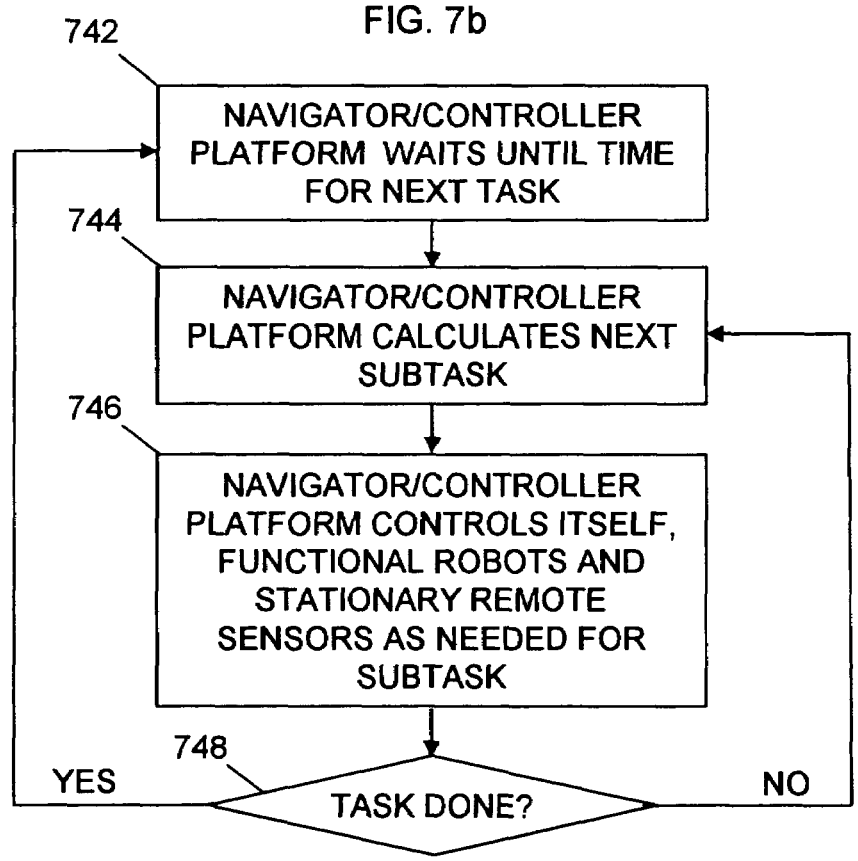
FIG. 7c is a flow diagram illustrating one method by which the navigator/controller platform controls and tracks functional robots during task performance.

In one embodiment, navigator/controller platform 1110 controls functional robots 120, 1120 to perform the scheduled tasks. The steps involved in planning and control are illustrated in more detail in FIG. 7c. At step 742, navigator/controller platform 1110 waits for the time (according to the task schedule developed as described above) to begin performing the next scheduled task. At or before the time arrives for the next task, in step 744, navigator/controller platform 1110 recursively calculates the next lowest level subtask. Examples of lowest level subtasks include controlling a functional robot and tracking another functional robot until an event occurs. Of course, in a sentry-type setting the tasks could include patrolling a given area, such as a portion of a house or industrial building or a floor in an office building. For such a task, the functional robot could follow a preplanned path at regular intervals or could follow a random path for a given period of time from a given starting point until it arrives at a desired ending point. The navigator/controller platform controls itself or moves and/or controls the appropriate functional robot(s) to perform each subtask (step 746). Navigator/controller platform 1110 issues appropriate control signals 209 to functional robots 120, 1120 via its transmitter 208 (see FIGS. 3a and 3b). This planning and control loop is iterated until the entire task is complete (decision node 748).

Navigator/controller platform 1110 directs functional robots 120, 1120 along the planned routes using the functional robots' control loops. As described above, in one embodiment, the control loop for moving and maneuvering robot 120, 1120 comprises power source and power supply system 402, motor controller 404, motor 406 and wheels 408. Control signals received from navigator/controller platform 1110 via receiver 302 direct motor controller 404. Controller 404 controls motor 406, which in turn drives wheels 408. The control loop may also comprise servos, actuators, transmitters and the like.

While a first functional robot 120, 1120 is moving, in one embodiment, navigator/controller platform 1110 remains stationary and, using the environmental sensors 304 aboard a second functional robot 1120, tracks the first functional robot's 120, 1120 progress. A number of suitable tracking algorithms will be familiar to those of ordinary skill in the art. Since navigator/controller platform 1110 is stationary, the localization computational overhead associated with the tracking algorithms is vastly reduced. Moreover, keeping the navigator/controller platform stationary reduces delays associated with navigating around unforeseen obstacles. Navigator/controller platform 1110 can first use a functional robot to test the planned route. If a collision occurs, navigator/controller platform 1110 still knows its own position and can track the position of the functional robot as it directs it to travel an alternate path using the environmental sensors 304 aboard a second functional robot 1120. As shown in FIG. 5, navigator/controller platform 1110 can "see" obstacles 510 via sensor input 530 from environmental sensors on board functional robot 1120 and can direct a functional robot 120 around the obstacle 510 via control loops 520. This is far less computationally intensive than if navigator/controller platform 1110 itself needed to perform the tasks of a functional robot, or if the functional robot 120 needed to perform the tracking process.

In one embodiment, navigator/controller platform 1110 is able to track and control the functional robots while the functional robots are moving at rates substantially faster than that found in conventional systems. In particular, in one embodiment, the system is capable of movement at a rate substantially faster than one foot per second per 1,000 MIPS. Additionally, navigator/controller platform 1110 may have sufficient processing power to perform some or all mapping and localization functions while simultaneously tracking and controlling the functional robots.

Eventually, navigator/controller platform 1110 may need to be relocated in order to continue tracking functional robots 120, 1120 via environmental sensors on board other functional robots 1120. Typically, this will occur when the working functional robots 120, 1120 need to move far away or have moved out of range of the transmitter in navigator/controller platform 1110. When navigator/controller platform 1110 determines that it needs to be relocated in one embodiment, it commands the working functional robots 120, 1120 to cease movement, then it may be relocated manually. Nevertheless, it should be noted that the use of additional functional robots 1120 with environmental sensors will generally preclude the need to relocate navigator/controller platform 1110. Furthermore, in an alternative embodiment, the navigator/controller platform is a mobile robot (FIG. 13) with wheels and associated control components similar to those in the functional robots. The navigator/controller robot may move itself when a working functional robot moves out of range.

As shown in FIG. 6, in one implementation, when a functional robot 1120 is moving, the navigator/controller platform 1110 uses sensor input 610 from environmental sensors 304 to triangulate on a functional robot 120 and another landmark 612 such as the corner of a room or window. Using this data, functional robot 1120 then moves into proper position. When functional robot 1120 arrives at the new location, the navigator/controller platform 1110 undertakes dynamic mapping and localization (as described above) to ensure that it knows where the functional robot 1120 is. This process may take several minutes as landmarks may be distant or obscured, and errors may be present in the map or location data. This iterative process is relatively quick compared to traditional methods, since at least one landmark having precisely known dimensions is normally nearby functional robot 1120. Once navigator/controller platform 1110 has been relocated within sufficient range of functional robots 120, 1120, in one implementation, the method returns to step 744 (FIG. 7c) and navigator/controller platform 1110 calculates the next subtask to further task performance. The recursive calculation of subtasks is based on algorithms that minimize the movement of the navigator/controller platform.

In one implementation, navigator/controller platform 1110 tracks the functional robot(s) as they perform the tasks. For example, navigator/controller platform 1110 can use a motion model of the movement required by the task to assist in tracking the robots. The motion model comprises the expected linear and angular velocities and accelerations of the functional robots for a given surface type and set of inputs to the robot's motors and actuators. Once the motion model provides a rough estimate of the functional robot's location, navigator/controller platform 1110 can use environmental sensors on board, functional robots 1120 to obtain more accurate data. Various filtering algorithms may be used to filter motion model errors. In one implementation, Kalman filtering is used. Other suitable filtering algorithms known to those of ordinary skill in the art, such as g-h and Benedict-Bordner, may also be used. In essence, x-y and orientation data is tracked and the filtering algorithm reduces errors due to the motion model and sensor input.

At decision node 748 (FIG. 7c), navigator/controller platform 1110 determines whether the entire task or subtask is complete. If the task is complete, the method returns to step 742 and navigator/controller platform 1110 waits for the time to begin the next task or subtask. In one implementation, completion of the task includes the functional robots returning to a base station 130 (FIG. 1) for recharging. In this regard, it is noted that throughout movement and task performance, navigator/controller platform 1110 may estimate or monitor the power levels of the functional robots and return them for recharging as needed.

In moving and performing their tasks, some functional robots, such as sentries, roam a home or business transmitting optical images of the surrounding area and other environmental sensor data to the navigator/controller platform 1110. Various environmental sensors, including smoke, carbon monoxide, temperature, and humidity sensors, in addition to the environmental sensors that transmit optical images can be included on such roving functional robots. The navigator/controller platform 1110 compares the incoming optical image sensor data with mapped images to determine if any change warrants intervention. Likewise, the navigator/controller platform 1110 compares other environmental sensor data to stored thresholds to determine if warnings or intervention is necessary. The navigator/controller platform 1110 includes a communications port with access to a public telephone line and can utilize the telephone connection to call for help. The telephone connection can be wired or wireless. Likewise, the public telephone line may include land and/or wireless segments. The optical images transmitted to the navigator/controller platform 1110 can also be accessed remotely via the Internet or other medium, permitting someone in at distant location to "see" what the sentry robot sees and evaluate whether or not an actual emergency is occurring at the location. Likewise, previous optical images that are stored during initial mapping of the area or subsequently may be communicated to remote locations along with the current optical images so that key personnel can compare the current images to previous images when evaluating the current situation. This enables remote monitoring of children, pets, cleaning services, doors, windows, employees, etc. when a person is not physically able check on such items. Additionally, functional robots can be configured for lawn mowing, floor cleaning (e.g., sweeping, mopping, dusting, etc.), or delivery service.

Figure 9:
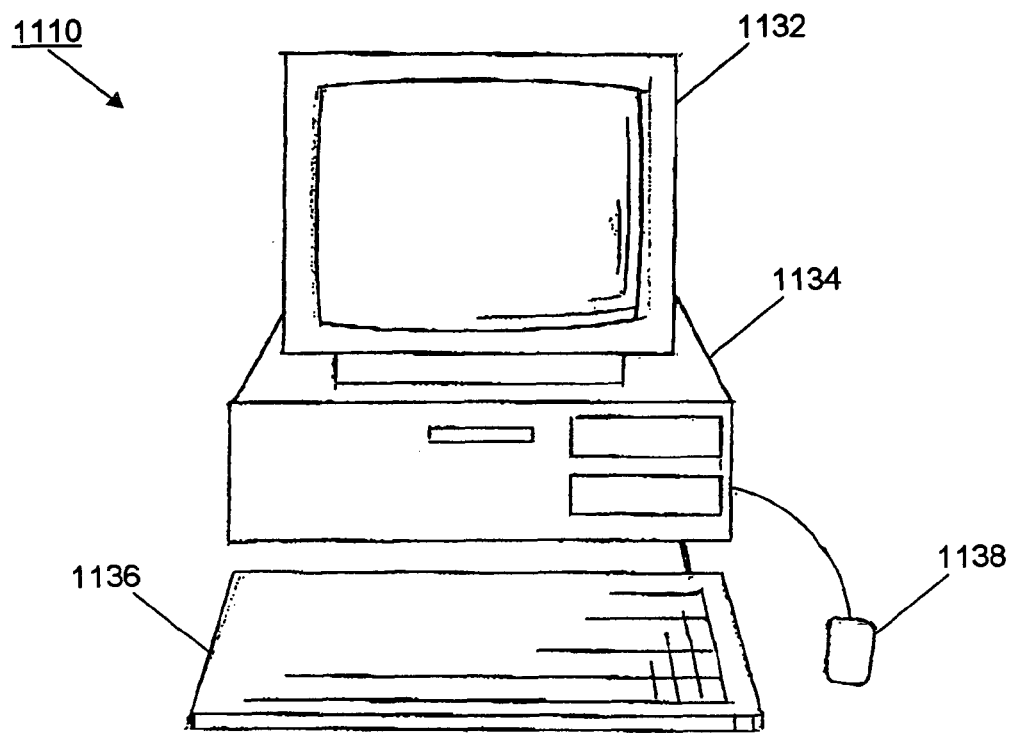
FIG. 9 is a stylized drawing of one embodiment of a navigator/controller platform of the robot system.

The navigator/controller platform 1110 can be embodied in various configurations. In one configuration, the navigator/controller platform 1110 is a standard computer system (FIG. 9). For example, the navigator/controller platform 1110 may be a personal computer. In another configuration, the navigator/controller platform 1110 is an appliance associated with the functional robots and dedicated to performing the navigator functions described above in conjunction with the robot system 1100. In still another configuration, the navigator/controller platform is a mobile robot (FIG. 13) with wheels and associated components similar to those in the functional robots.

Several embodiments of the invention have been shown and described above. Alternate embodiments of the invention are also envisioned. For example, another embodiment of the invention contemplates use of more than one navigator/controller platform 1110 or use of environmental sensor data/control signal repeater platforms. In another embodiment, a first set of platforms (i.e., navigator/controller platforms 1110 and functional robots 1120) are responsible for all or substantially all mapping, localization, planning and control functions, and a second or functional set of platforms (i.e., navigator/controller platforms 1110 and functional robots 120, 1120) are responsible for functional task completion. The first set of platforms, then, are responsible for planning, navigating and tracking task performance by the second set. This embodiment of the invention may be appropriate where there are too many functional robots for one navigator/controller platform to command and control, or where the functional robots are spread out over a particularly large geographic area. For example, in a large factory or a tall office building, several navigator/controller platforms may be necessary with each navigator/controller platform communicating with, and directing the activities of a set of functional robots (e.g., cleaning robots). It should also be appreciated that a functional robot can simultaneously also serve a sentry function. For example, a functional robot can perform a maintenance task while at the same time sensing carbon monoxide, temperature, smoke or the like. In addition, a functional robot can send video images to the navigator/controller platform and/or a central command post for observation by a person.

Finally, in any of the foregoing embodiments, any stationary or mobile platform could be dedicated to perform some or all of the processing and computation. In such a configuration, any platform may be equipped with appropriate environmental sensors for gathering data. The environmental sensor data, either raw or partially processed, may be transmitted to a dedicated stationary or mobile platform for further processing via a wireless network or any other suitable means for communication. The dedicated platform may perform the computations, and communicate the results to a navigator/controller platform.

Figure 8:
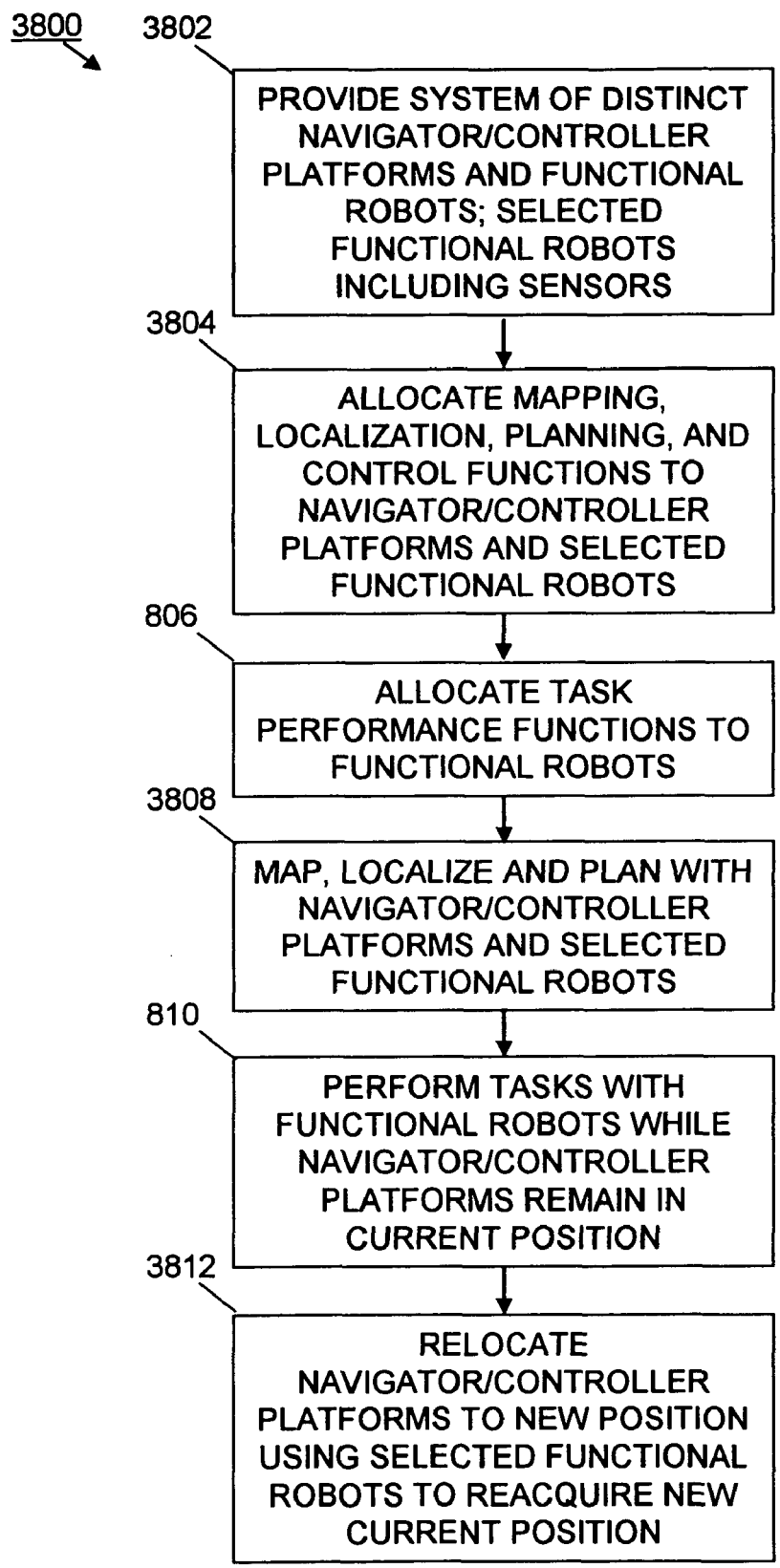
FIG. 8 is a flow diagram showing one method of implementing the robot system according to one embodiment of the invention.

In reference to FIG. 8, a flow diagram showing one method 3800 of implementing one embodiment of the robot system 1100 is provided. In step 3802, an autonomous system comprised of distinct stationary navigator/controller platforms and mobile functional robots is provided, wherein one or more of the functional robots include environmental sensors (i.e., selected functional robots). In step 3804, the functions of mapping, localization, planning and control are assigned to at least one navigator/controller platform and at least one selected functional robot.

In step 806, the responsibility for functional task completion is assigned to at least one functional robot. In step 3808, the navigator/controller platforms and selected functional robots with environmental sensors map the environment, localize all robots within the environment and plan a task performance schedule. These tasks may be subdivided into smaller tasks to facilitate easier tracking and to limit the need to relocate the navigator/controller platforms. In step 810, the navigator/controller platforms may remain stationary while controlling the functional robots to perform the assigned tasks. In step 3812, which is optional, the navigator/controller platforms may be relocated to a new position using selected functional robots with environmental sensors to reacquire the new current position.

FIGS. 9–12 provide stylized drawings of several embodiments of the various platforms of the robot system 1100 describe above. More specifically, FIG. 9 provides a stylized drawing of one embodiment of a navigator/controller platform 1110 in a configuration similar to a standard computer system. In this embodiment, the navigator/controller platform 1110 can be stationary and include a display device 1132, a controller/processor 1134, a keyboard 1136, and a pointing device (e.g., mouse) 1138. An antenna (not shown), along with the transmitter 208 and receiver 222, is associated with the controller/processor 1134.

Figure 10:
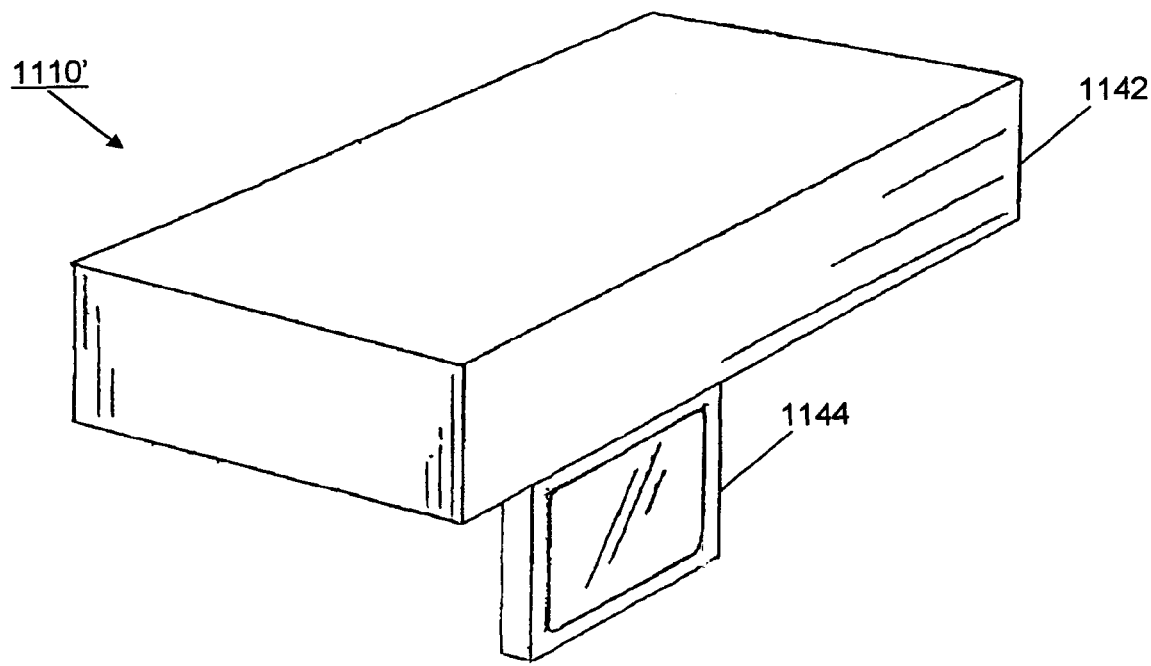
FIG. 10 is a stylized drawing of another embodiment of a navigator/controller platform of the robot system.

FIG. 10 provides a stylized drawing of another embodiment of a navigator/controller platform 1110'. In this embodiment, the navigator/controller platform is an appliance associated with functional robots and dedicated to performing the navigator functions described above in conjunction with the robot system 1100. Note that the navigator/controller platform 1110' includes a controller/processor 1142 and a display device 1144. The display device 1144, which can be a screen, may be readily accessible to a person wishing to check on the status of the sentry robot or robots communicating with the navigator/controller platform. An input device (not shown) and an antenna (not shown), along with a transmitter and a receiver are associated with a controller/processor. Of course, the navigator/controller platforms 1110 and 1110' can be mounted on a mobile platform, if so desired, to provide navigator/controller robots. Such a mobile platform can be, for example, a self-propelled vehicle.

Figure 11:
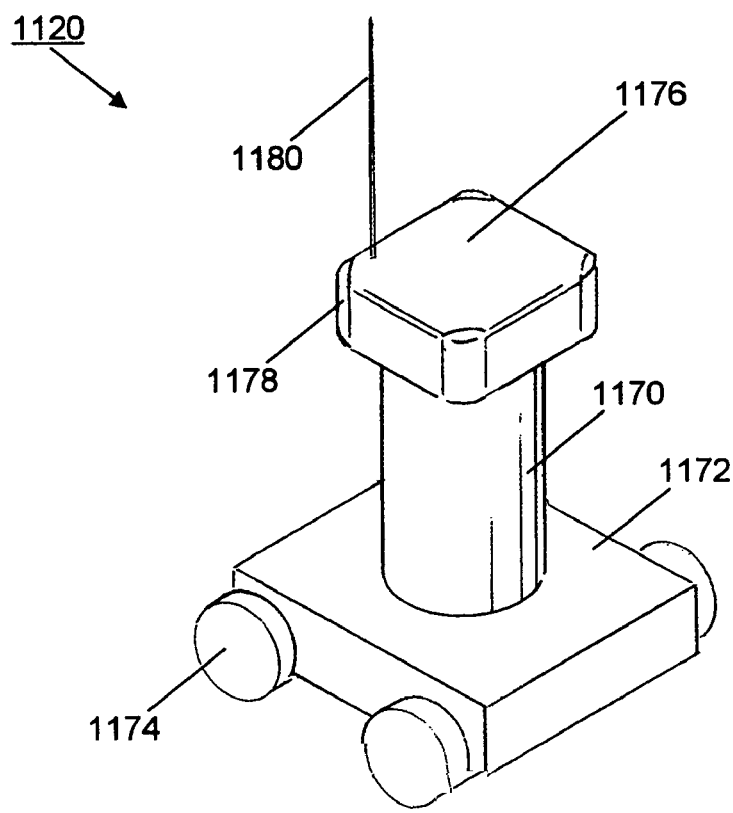
FIG. 11 is a stylized drawing of one embodiment of a functional robot of the robot system.

FIG. 11 provides a stylized drawing of one embodiment of a functional robot 1120. Note that functional robot 1120 includes one or more known types of environmental sensors. The environmental sensors may be mounted on a column 1170 extending upwardly from a housing 1172 supported on four wheels 1174, one at each corner of the approximately rectangular housing. The column 1170 supports a sensor housing 1176 which can contain environmental sensors 1178 at each corner of a somewhat square-shaped body, which also sports an antenna 1180.

Figure 12:
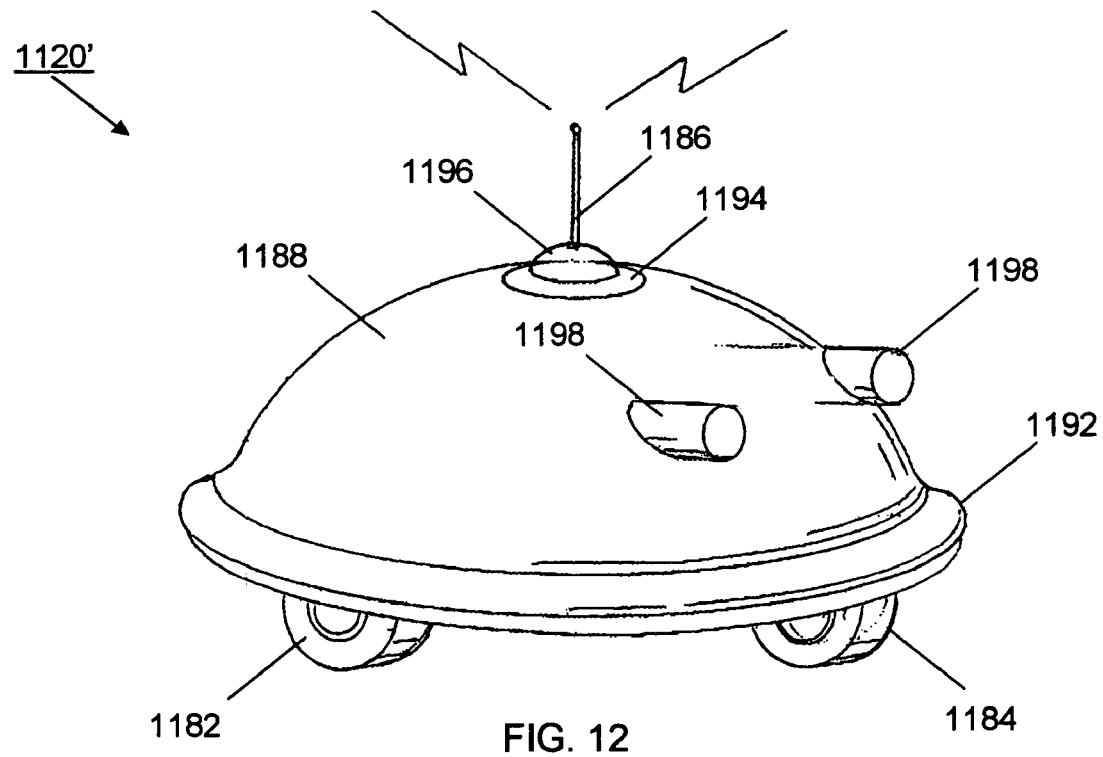
FIG. 12 is a stylized drawing of another embodiment of a functional robot of the robot system.

FIG. 12 provides a stylized drawing of another embodiment of a functional robot 1120'. In this embodiment, the functional robot 1120' includes back wheels 1182 and a front wheel 1184, as well as a communication antenna 1186 mounted on a housing 1188. Note the use of a bumper 1192 positioned along a perimeter at a lower end of the housing 1188. A smoke sensor 1194 and humidity sensor 1196 are provided in this embodiment, along with two optical sensors (e.g., video cameras) 1198. Various other types of known environmental sensors, including carbon monoxide and temperature sensors, may be provided in addition to or in lieu of the smoke and humidity sensors.

Figure 13:
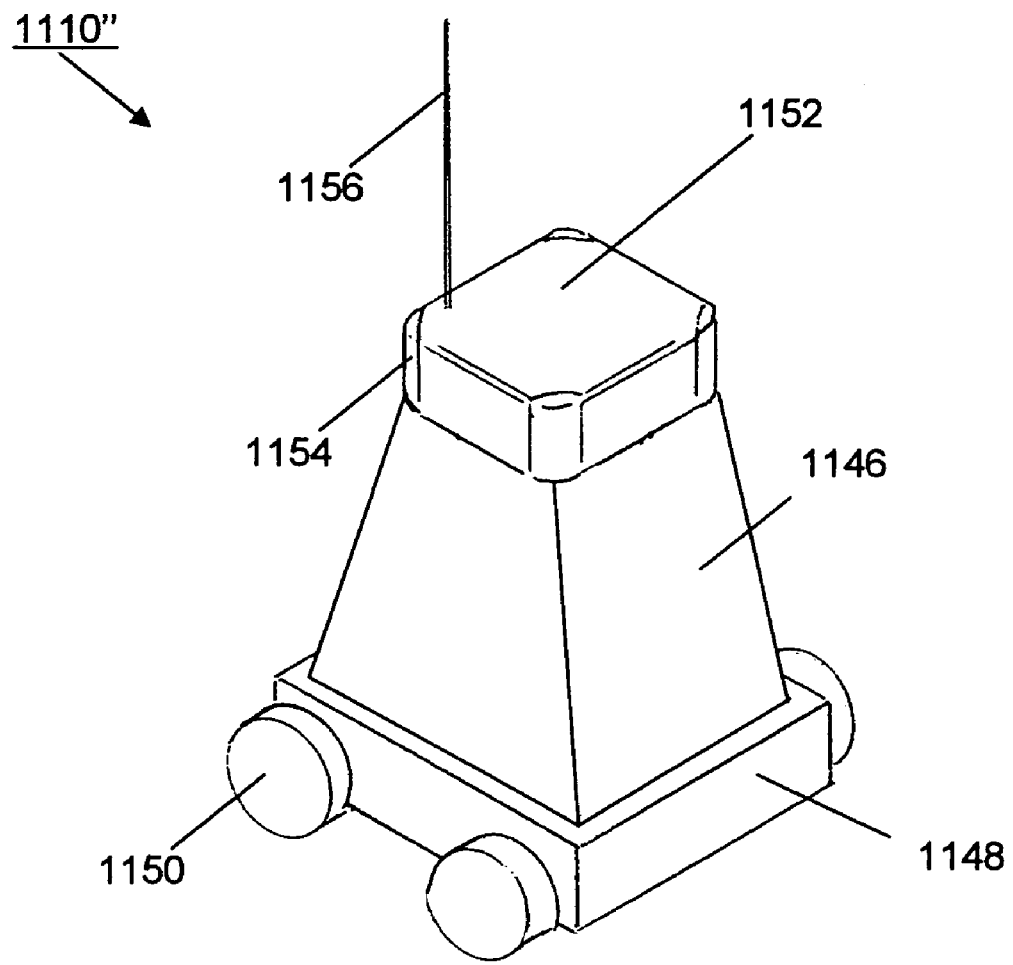
FIG. 13 is a stylized drawing of another embodiment of a navigator/controller platform of the robot system.

FIG. 13 provides a stylized drawing of another embodiment of a navigator/controller platform 1110". Note that navigator/controller platform 1110" is a mobile robot and includes one or more known types of environmental sensors. The environmental sensors may be mounted on a housing 1146 extending upwardly from a base 1148 supported on four wheels 1150, one at each corner of the approximately rectangular base. The housing 1146 supports a sensor housing 1152 which can contain environmental sensors 1154 at each corner of a somewhat square-shaped body, which also sports an antenna 1156. As with the functional robots of the FIGS. 4a and 4b, it should be appreciated that the navigator/controller platform 1110" is provided with known motive means to drive the wheels 1150 as needed. As a mobile platform, in addition to performing the navigation and control functions described herein, the navigator/controller platform 1110" may also be adapted to perform mapping and functional tasks described above for the functional robots.

While the invention is described herein in conjunction with exemplary embodiments, it is evident that many alternatives, modifications, and variations will be apparent to those skilled in the art. Accordingly, the embodiments of the invention in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

The invention claimed is:

1. A sentry robot system comprising:
at least one first-type functional robot with one or more environmental sensors, the at least one first-type functional robot configured to perform one or more repetitive tasks within an area, the one or more repetitive tasks including collection and transmission of environment data associated with at least a portion of the area using environmental sensors including at least one of a smoke sensor, a carbon monoxide sensor, a temperature sensor, a humidity sensor, and an optical image senor; and at least one navigator/controller platform configured to receive environment data transmitted by the at least one first-type functional robot, wherein the environmental data from the at least one first type functional robot is initially transmitted back to the navigator/controller platform in order to create an image map of the environment using the environmental data then after the image map is complete for an area new environmental data is compared with the image map to, a) determine if intervention is required due to changes within the environment;
b) update the image map; or
c) direct overall movement of the at least one first-type functional robot within the area, and control the at least one first-type functional robot during performance of the one or more repetitive tasks.

2. The system of claim 1 wherein the at least one navigator/controller platform is configured to determine the location of the at least one first-type functional robot within the area.

3. The system of claim 1 wherein the at least one navigator/controller platform is configured to plan overall movement of the at least one first-type functional robot within the area.

4. The system of claim 1 wherein the at least one navigator/controller platform is configured to track overall movement of the at least one first-type functional robot within the area using the environment data.

5. The system of claim 1, further comprising:
at least one second-type functional robot configured to perform one or more maintenance tasks within the area;
wherein the at least one navigator/controller platform is also configured to direct overall movement of the at least one second-type functional robot in the area and to control the at least one second-type functional robot during performance of the one or more maintenance tasks.

6. The system of claim 1 wherein the at least one navigator/controller platform is adapted to communicate at least with current conditions within the area to a remote location via a public telephone line if intervention is required.

7. The system of claim 6 wherein the one or more environmental sensors includes at least one optical image sensor and the current conditions communicated to the remote location includes an optical image of at least a portion of the area.

8. A sentry robot system operating within an area and comprising:
one or more functional robots that are responsible for performing functional tasks;
one or more environmental sensors, including at least one of a smoke sensor, a carbon monoxide sensor, a temperature sensor, a humidity sensor, and an optical image senor, which are associated with at least one of the one or more functional robots for collecting environment data associated with the area, wherein the functional tasks performed by the at least one of the one or more functional robots include collection and transmission of the environment data; and
one or more navigator/controller platforms that localize themselves and the one or more functional robots within the area using the environment data transmitted by the one or more functional robots, plan the functional tasks to be performed by the one or more functional robots, and control the one or more functional robots during performance of the functional tasks, wherein each navigator/controller platform comprises:
a receiver for receiving the environment data transmitted by the at least one of the one or more functional robots;
a controller for generating maps of the area from the environment data, for comparing image map data with current environment data to determine if intervention is required, for updating the image map data with current environment data, for controlling and directing operations of the one or more functional robots within the area, and for controlling the one or more functional robot during performance of the one or more repetitive tasks;
a memory for storing the maps of the area; and
a transmitter for transmitting control signals to the one or more functional robots.

9. The robot system of claim 8 wherein the one or more navigator/controller platforms generate a dynamic map of the area using the environment data, create a temporary map using the environment data most recently transmitted by the at least one functional robot, incorporate the temporary map into the dynamic map, and move the at least one of the one or more functional robots to a new location to obtain new environment data.

10. The robot system of claim 8 wherein the one or more navigator/controller platforms generate a static map of the area using the environment data transmitted by the at least one of the one or more functional robots by mapping the outer perimeter of the area while moving the at least one of the one or more functional robots along the outer perimeter of the area.

11. The robot system of claim 8 wherein the one or more navigator/controller platforms store the tasks to be performed by the one or more functional robots in the memory.

12. The robot system of claim 8 wherein the one or more navigator/controller platforms plan the tasks to be performed by the one or more functional robots by determining what tasks need to be completed, match the one or more functional robots to particular tasks, and develop a task schedule.

13. The system of claim 8 wherein the one or more navigator/controller platforms compare new environment data to previously stored environment data to determine if any change in at least a portion of the area warrants intervention.

14. The system of claim 13 wherein the at least one navigator/controller platform is adapted to communicate at least an image of the area to a remote location via a public telephone line if any change in at least a portion of the area warrants intervention.

15. The system of claim 14 wherein the image of the area communicated via the public telephone line can be accessed via the Internet.

16. A sentry robot system operating within an environment and comprising:
one or more first-type functional robots with one or more environmental sensors, including at least one of a smoke sensor, a carbon monoxide sensor, a temperature sensor, a humidity sensor, and an optical image senor, where the one or more first-type functional robots are responsible for collecting environment data using the one or more environmental sensors, for transmitting the environment data, and for performing functional tasks; and
one or more navigator/controller platforms that control the one or more first-type functional robots during collection of the environment data, receive the environment data from the one or more first-type functional robots, use the environment data to localize themselves and the one or more first-type functional robots within the environment, use the environmental data to create an initial image map of the environment and then compare new environmental data with the existing image map to, a) determine if intervention is required due to changes within the environment;
b) update the image map;
or
c) plan the functional tasks to be performed by the one or more first-type functional robots, and control the one or more first-type functional robots during performance of the functional tasks.

17. The robot system of claim 16, further comprising:
a base station for recharging of the one or more first-type functional robots and for assisting in completion of the functional tasks and in tracking of the one or more first-type functional robots.

18. The robot system of claim 16 wherein computations associated with localization, planning and control are performed by the one or more navigator/controller platforms and at least some results associated with such computations are communicated to the one or more first-type functional robots.

19. The robot system of claim 16 wherein the environment data includes optical images of the area surrounding the one or more first-type functional robots.

20. The robot system of claim 19 wherein the one or more navigator/controller platforms generate a map of the area using the optical images, store the map as mapped optical images, compare new optical images to mapped optical images to determine if current conditions within the area require intervention, and, if intervention is required, communicates at least the new optical image to a remote location so that a person can determine whether or not a potential emergency condition exists.

21. The robot system of claim 16 operating within an environment and comprising:
one or more second-type functional robots responsible for performing functional tasks, the functional tasks including at least one of lawn mowing, floor cleaning, sweeping, mopping, dusting, and delivery service tasks;
wherein the one or more navigator/controller platforms also plan the functional tasks to be performed by the one or more second-type functional robots, and control the one or more second-type functional robots during performance of the functional tasks.

22. A method for operation of a sentry robot system within an environment, the sentry robot system including at least one functional robot with one or more environmental sensors and at least one navigator/controller platform, the one or more environmental sensors including at least one optical image sensor, the method comprising the following steps:
a) collecting environment data in an area of the environment surrounding the at least one functional robot using the at least one optical image sensor;
b) transmitting environment data from the at least one functional robot to the at least one navigator/controller platform;
c) transmitting control signals from the at least one navigator/controller to the at least one functional robot to move the at least one functional robot to another area of the environment;
d) repeating steps a) through c) until an initial set of environment data for the environment is collected and transmitted;
e) creating an image map of the environment from the environment data;
f) periodically moving the at least one functional robot to one or more predetermined locations within the environment, collecting new environment data using the at least one optical image sensor at each predetermined location; and
g) periodically comparing the new environment data to corresponding locations in the image map and determining if intervention is required due to changed conditions within the environment.

23. The method of claim 22, further comprising the following step:
h) if an intervention is required, communicating an image associated with the new environment data associated with the changed condition to a remote location.

24. The method of claim 23, further comprising the following step:
i) accessing the image associated with the new environment data from the remote location using the Internet.

25. The method of claim 22 wherein the one or more environmental sensors include at least one of a smoke sensor, a carbon monoxide sensor, a temperature sensor, and a humidity sensor.

26. The method of claim 25, further comprising the following steps:
h) periodically moving the at least one functional robot to one or more predetermined locations within the environment, collecting environment data using the one or more environmental sensors at each predetermined location, and comparing the new environment data to predetermined thresholds; and
i) periodically determining if intervention is required due to current conditions within the environment.

27. The method of claim 26, further comprising the following step:
h) if an intervention is required, communicating information associated with the new environment data requiring the intervention to a remote location via a public telephone line.

* * * * *